No. 767,087. PATENTED AUG. 9, 1904.
C. H. SPECKMAN.
CALCULATOR.
APPLICATION FILED AUG. 29, 1903.
NO MODEL.
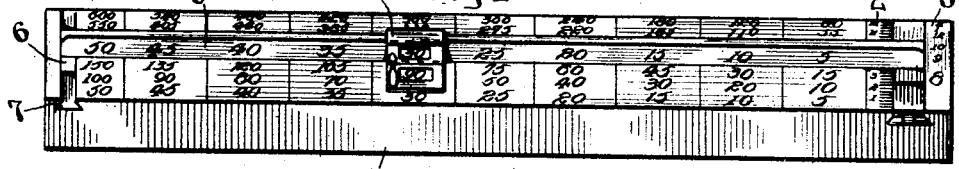
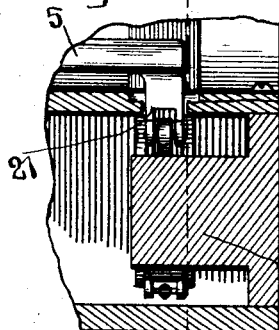
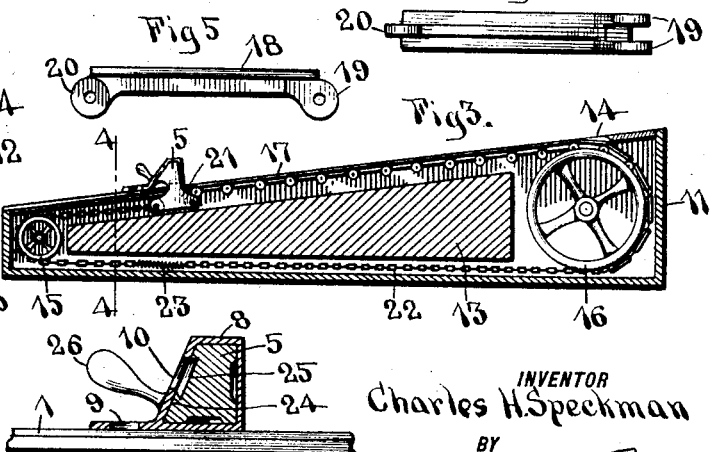
WITNESSES:
W. J. Hartman
Edw. W. Vaill Jr.
INVENTOR
Charles H. Speckman
BY
James Pettis
ATTORNEY.

No. 767,087. Patented August 9, 1904.

UNITED STATES PATENT OFFICE.

CHARLES H. SPECKMAN, OF PHILADELPHIA, PENNSYLVANIA.

CALCULATOR.

SPECIFICATION forming part of Letters Patent No. 767,087, dated August 9, 1904.

Application filed August 29, 1903. Serial No. 171,167. (No model.)

*To all whom it may concern:*

Be it known that I, CHARLES H. SPECKMAN, a citizen of the United States, and a resident of the city of Philadelphia, State of Pennsylvania, have invented certain new and useful Improvements in Calculators, of which the following is a full, clear, and complete disclosure.

The object of my invention is to produce a device which when two numbers or limits are known their differences may be found without mental calculation and said difference then multiplied by any one of a series of numbers, and this operation is particularly employed in calculating wages when the hours of beginning and ending work are known, so that said difference may be multiplied by the rate of wages according to a scale adopted in a mercantile, manufacturing, or other business.

In large concerns where a great number of persons are employed in different capacities which require different rates of compensation it is desirable for rapid and accurate work to have some means whereby the amount due each employee at the end of a week or other wage period may be quickly and accurately determined without a great number of tedious and possibly inaccurate calculations. The device herein set forth is designed to accomplish this object in a simple efficient manner.

Broadly my invention consists of a tablet or plate which has at one end thereof means for determining an amount of difference between two numbers, said means being connected with a device which extends across said tablet and which is adapted to multiply said difference by any one of a series of numbers provided on said device.

My invention also consists in certain features of construction providing a simple and efficient means for operating the parts above referred to.

For a full, clear, and exact description of my invention reference may be had to the following specification and to the accompanying drawings, forming a part thereof, in which—

Figure 1 represents a top plan view of my improved calculator; Fig. 2, an end elevation of the same; Fig. 3, a sectional view of a slightly-modified form, showing the arrangement for operating the mechanical part, said view being taken substantially as a section on the line 3 3, Fig. 4; Fig. 4, a transverse sectional view of the same, taken substantially on the line 4 4, Fig. 3; Fig. 5, an elevation of one of the links forming a part of the sliding scale in the modified form; Fig. 6, a plan view of the same, and Fig. 7 a sectional view of the sliding indicator and its supporting-arm adapted to be used with the device as shown in the form first referred to or the modification.

Rerring to the drawings, the numeral 1 indicates a tablet or base having two fixed scales 2 and 3 at one side thereof, between which fixed scales is a third scale 4, adapted to slide between the said scales 2 and 3. The sliding scale may be held in position in any suitable way, but preferably in this form is carried in a dovetailed groove, the scale being shaped to fit said groove. The sliding scale 4 carries at its lower end an arm extending at right angles thereto across the tablet or base, and the outer end of said arm is also preferably supported by engaging a block 6, carried in a dovetailed groove 7. The transverse arm 5 is adapted to carry a sliding indicator 8, which has two openings therein, through one of which the figures on the arm may be observed, while through the other the figures on the tablet may be seen. These are clearly indicated at 9 and 10 in Fig. 7.

The fixed scale 3 and the sliding scale 4 are provided with a series of numbers, which are placed in the same relative positions upon said scales and preferably range from "1" to "12," although it is obvious that any other series of figures may be used. The fixed scale 2 is also provided with a series of figures ranging from "1" to "12" to correspond to the scales before referred to; but in this scale the figures should read consecutively from the bottom upward, beginning with "1." It will now be seen that when a figure of the sliding scale, which may represent the time when work was commenced, is placed opposite a figure on the fixed scale 3, which may represent the time when work was finished, the difference between said figures will be indicated at the lower end of the sliding scale on the fixed scale 2. As, for example, if the figure "10"

is placed opposite the figure "11" on the respective scales 3 and 4 the difference, one, first will be indicated on the scale 2, and in the same manner greater or less differences between other combinations of figures will be indicated. The transverse arm 5 is provided with a series of figures, which may represent a number or rate to be multiplied by the differences before mentioned, and in this case represent wage-rates in cents per hour. These figures correspond to vertical columns of figures, which represent the product of the numbers on the fixed scale 2 with the number on the arm 5 which corresponds to any vertical column. The numbers in the columns are also arranged in horizontal rows opposite the numbers on the fixed scale 2, which represent the multiplier, so that any number on the arm 5 will represent the multiplicand. It will now be seen that when a difference has been determined by the fixed scale 2 the arm 5 will extend across the tablet or block 1 just above the horizontal row of figures corresponding to that difference, and as the sliding indicator 8 is moved longitudinally of said arm, so as to place the opening above any figure thereon, the lower opening in said indicator will correspond with a number which is the product of the number on the arm 5 and the number indicating the difference on the fixed scale 2. In this manner the exact amount due any employee may be quickly calculated by making two movements of the parts of my device, the first movement being that of the sliding scale and the second being that of the sliding indicator on the transverse arm.

Various mechanical constructions may be employed to render my device compact and convenient in operation, and one which I prefer to use I shall now proceed to describe. In this modification the base 11 is made in the form of a hollow box or casing and in plan view is substantially the same as that shown in Fig. 1, the only difference being in the slidable scale, which is flexible and bends to enter a slot in the casing instead of projecting therefrom, as indicated at 4 in Fig. 1. From one end 12 of the casing projects a transverse support or platform 13. The support 13 projects beneath an opening or slot 14 in the upper side of the casing 11, said opening being enlarged at its upper portion to form supports for the sliding scale hereinafter to be described. The support 13 does not extend the whole width of the casing 11, but stops short of the sides, leaving spaces for the grooved wheels 15 and 16, which have suitable bearings supported by the end 12 of the casing in any suitable manner. The wheels 15 and 16 are in alinement with the opening 14 in the top of the casing, and the larger wheel, 16, is adapted to carry in its groove a chain 17, having flat links which are adapted to rest in the enlarged portion of the slot 14 in the casing. These links are illustrated in Figs. 5 and 6 and consist of an elongated plate 18, having double ears 19 at one end and single ears 20 at their opposite ends. The single ears 20 are adapted to be pivoted between the double ears 19 of the adjacent link by a suitable pivot-pin. The lower end of the chain 17 is attached to a wheeled carriage or traveler 21, which supports the transverse arm 5. The upper or opposite end of the chain 17 is attached to a chain 22, the other end of which is attached to the carriage 21. A coiled spring 23 is preferably interposed in the chain 22 to keep the parts of both chains taut and in place upon their respective wheels. The chain 17 is provided upon its upper surface formed by the plates 18 with figures corresponding to those on the sliding scale 4 of the form first described, and in all other respects the two forms are similar in construction. The transverse arm 5 is provided with an inclined surface 24, which is adapted to receive the figures of the wage-scale. These figures are preferably carried upon a strip of cardboard or other similar material, which is adapted to be inserted within the dovetailed groove 25 in said inclined surface 24. The indicator 8 is preferably in the form of a strap of metal or other material, within which are the openings 9 and 10, as indicated in Fig 7. The indicator 8 is also provided with a handle 26 for moving the same along the arm.

Various changes in detail may be made without departing from the spirit and scope of my invention; but

What I claim, and desire to protect by Letters Patent of the United States, is—

1. In a calculator, series of numbers, means for indicating the difference between two numbers and means controlled by said first-named means for correlating said difference and any one of the series of numbers and for indicating the product thereof.

2. In a calculator, series of numbers, slidable and fixed scales for indicating the differences between two sets of numbers and means controlled by the slidable scale for correlating said difference and any one of the series of numbers and for indicating the product thereof.

3. In a calculator, slidable and fixed scales, series of numbers, means carried by the slidable scale for correlating a difference determined by the fixed scales with any one of the series of numbers and for indicating the product thereof.

4. In a calculator, a slidable scale, two fixed scales one of said fixed scales being adapted to indicate the difference between two numbers on the slidable and the other fixed scale respectively, a transverse arm controlled by said slidable scale and having a series of numbers thereon and an indicator carried by said arm and adapted to indicate the product of the difference determined by the fixed scale and one of the numbers carried by said arm.

5. In a calculator, a slidable and fixed scales, one of said fixed scales adapted to indicate the difference between two numbers on the slidable and other fixed scale respectively, a transverse arm carried by the slidable scale and having a series of numbers thereon, and an indicator adapted to indicate the product between said difference and one of the numbers on said arm.

6. In a calculator, a tablet having a series of columns with figures thereon, slidable and fixed scales arranged at one side of said tablet and adapted to indicate the difference between two numbers, a transverse arm carried by the slidable scale having a series of numbers thereon corresponding to the columns of figures on the tablet and an indicator carried by said arm adapted to indicate the figures in said columns which correspond to the product of said difference and one of the numbers on said arm.

7. In a calculator, fixed scales, a slidable, flexible scale adapted to coöperate with said fixed scales to indicate the difference between two numbers, a transverse arm controlled by said slidable scale and a carriage adapted to hold said transverse arm in position in connection with said slidable scale.

8. In a calculator, fixed scales, a slidable scale composed of a series of links, a transverse arm controlled by said slidable scale and a carriage for holding said transverse arm in position in connection with said scale.

9. In a calculator, fixed scales, a slidable scale in the form of a chain having flat links, a transverse arm controlled by said chain and a carriage for holding said arm in position in connection with said links.

10. In a calculator, a slidable scale comprising a series of flat connected links, a carriage attached to one of said links, a flexible connection between said carriage and another of said links and means for movably supporting said parts.

11. In a calculator, a slidable scale in the form of a chain having flat links, a carriage attached to one end of said chain, a chain of the ordinary form connecting said carriage and the other end of said scale-chain, wheels for supporting said chains and a support for said carriage.

12. In a calculator, a slidable scale in the form of a chain having flat links, a carriage attached to one end of said chain, a transverse arm supported by said carriage, a chain of the ordinary form connecting said carriage with the other end of said scale-chain, a spring interposed in said connecting-chain, wheels for supporting said chains and a support for said carriage.

13. In a calculator, a casing having a longitudinal opening therein, a flexible scale in the form of a chain having flat links adapted to slide in said opening, a carriage also adapted to slide in said opening and carrying a transverse arm extending over said casing and means for supporting said chain and said carriage contained within said casing.

14. In a calculator, a casing having a slot in the upper surface thereof, a flexible scale adapted to slide in said slot, said scale being in the form of a chain having a series of flat links, a carriage also adapted to project through said opening or slot and to slide therein, a chain of the ordinary form connecting said carriage and the end of said scale-chain, a projection carried by said casing adapted to support said carriage and grooved wheels for supporting said chains.

In witness whereof I have hereunto set my hand this 27th day of August, 1903.

CHARLES H. SPECKMAN.

Witnesses:
    Lewis H. Van Dusen,
    Edw. W. Vaill, Jr.